United States Patent
Brasme et al.

(10) Patent No.: US 11,081,307 B2
(45) Date of Patent: Aug. 3, 2021

(54) ELECTRICAL POWER SUPPLY DISCONNECTOR FOR A PROTECTION MODULE AND PROTECTION MODULE INCLUDING SUCH A DISCONNECTOR

(71) Applicant: Schneider Electric Industries SAS, Rueil Malmaison (FR)

(72) Inventors: Frederic Brasme, Le Bourg d'Oisans (FR); Vivien Moliton, Seyssins (FR); Bruno Lefevre, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 296 days.

(21) Appl. No.: 16/136,384

(22) Filed: Sep. 20, 2018

(65) Prior Publication Data
US 2019/0115180 A1    Apr. 18, 2019

(30) Foreign Application Priority Data

Oct. 16, 2017 (FR) ..................... 17 59656

(51) Int. Cl.
*H01H 71/10* (2006.01)
*H01H 1/44* (2006.01)
(Continued)

(52) U.S. Cl.
CPC ......... *H01H 71/1045* (2013.01); *H01H 1/44* (2013.01); *H01H 15/06* (2013.01);
(Continued)

(58) Field of Classification Search
CPC .. H01H 71/1045; H01H 15/06; H01H 71/025; H01H 3/083; H01H 2201/004;
(Continued)

(56) References Cited

U.S. PATENT DOCUMENTS 3,259,699 A   7/1966  Du Temple De Rougemont et al.
3,259,728 A   7/1966  Du Temple De Rougemont et al.
(Continued)

FOREIGN PATENT DOCUMENTS

DE    1 540 327    4/1971
FR    2.092.263    1/1971

OTHER PUBLICATIONS

French Preliminary Search Report dated Jun. 6, 2018 in French Application 17 59656, filed on Oct. 16, 2017 (with English Translation of Categories of cited documents & Written Opinion).

*Primary Examiner* — Fred E Finch, III
*Assistant Examiner* — Rafael O De Leon Domenech
(74) *Attorney, Agent, or Firm* — Oblon, McClelland, Maier & Neustadt, L.L.P.

(57) ABSTRACT

An electrical power supply disconnector for establishing or severing the connection between current conductors and a power supply circuit. The electrical power supply disconnector includes a housing including a central passage, the walls of which bear contact strips that are located facing one another along a contact axis, and a slider sliding through the central passage in the direction of a centre axis, and bearing at least a first electrically conductive bar, oriented along the contact axis, for electrically connecting at least one first low contact strip and one high contact strip when the slider is in a first position. A protection module including such a power supply disconnector.

15 Claims, 7 Drawing Sheets

(51) Int. Cl.
  *H01H 15/06* (2006.01)
  *H01H 71/02* (2006.01)
  *H02H 3/08* (2006.01)
  *H02H 1/00* (2006.01)

(52) U.S. Cl.
  CPC .......... *H01H 71/025* (2013.01); *H02H 3/083* (2013.01); *H01H 2201/004* (2013.01); *H01H 2203/024* (2013.01); *H01H 2205/004* (2013.01); *H01H 2205/028* (2013.01); *H01H 2207/032* (2013.01); *H01H 2229/018* (2013.01); *H01H 2239/044* (2013.01); *H02H 1/0007* (2013.01)

(58) Field of Classification Search
  CPC ....... H01H 2203/024; H01H 2205/004; H01H 2207/032; H01H 2229/018; H01H 2239/044; H01H 1/007
  See application file for complete search history.

(56) References Cited

U.S. PATENT DOCUMENTS

| | | |
|---|---|---|
| 3,673,365 A | 6/1972 | Schadow |
| 7,023,305 B2 * | 4/2006 | Cuny .................... H01H 89/06 335/132 |

\* cited by examiner

ELECTRICAL POWER SUPPLY DISCONNECTOR FOR A PROTECTION MODULE AND PROTECTION MODULE INCLUDING SUCH A DISCONNECTOR

TECHNICAL FIELD

The present invention relates to a power supply disconnector used in a module for protection from electrical faults for establishing or severing the connection between current conductors and a power supply circuit of said protection module. The invention also relates to a protection module including such a power supply disconnector.

PRIOR ART

Generally, an electrical installation includes one or more devices for protection from overcurrents or ground faults. Such devices are suitable for operating within a voltage range matching the nominal voltage of the electrical network to which they are connected, for example 400 volts AC. However, when testing the dielectric strength of the electrical installation, test voltages, which are much higher than the nominal voltage or of a different nature, are applied to portions of the electrical installation, for example 2500 volts AC or else 500 volts DC. A protection device that is not able to withstand the test voltages must therefore be disconnected for the duration of the test. To simplify this operation, it is known practice to disconnect only certain circuits forming part of the protection device.

The patent application FR 2 992 093 A1 describes a device for disconnecting the electronic circuit board for supplying power to a fault processing circuit in an electrical protection unit.

The patent application FR 2 848 722 A1 describes a ground leakage circuit breaker including a switch that may be used for the dielectric strength test so as to "engage" or "disengage" a power supply circuit in conjunction with "engaging" or "disengaging" the main contact. The patent application JP 2004-319135 A describes a similar device including a plurality of switches that are mechanically actuated so as to open or close a plurality of power supply conductors at the same time.

In the documents known from the prior art, the switches may be positioned in parallel to the front surface of the protection unit since little in the way of information or control means are positioned on said front surface. With the incorporation of new functionalities, the increase in the area required by user interface means and, at the same time, the need to keep the external dimensions constant so as to ensure interchangeability with older hardware means there is a need to pack the components within the protection unit more densely.

The object of the invention is to provide a power supply disconnector for a module for protection from electrical faults that is very compact and able to withstand dielectric test voltages.

DISCLOSURE OF THE INVENTION

To achieve this, the invention describes an electrical power supply disconnector used in a module for protection from electrical faults for establishing or severing the connection between current conductors and a power supply circuit, said power supply disconnector comprising:
  a housing of rectangular section, including an upper wall and a lower wall, the inner surfaces of the upper wall and of the lower wall facing each other and defining a central passage oriented along a centre axis, the lower wall bearing, on its inner surface, at least one first lower contact strip, the upper wall bearing, on its inner surface, at least one first upper contact strip, said first upper contact strip being located facing the first lower contact strip along a contact axis; and
  a slider arranged to slide through the central passage in the direction of the centre axis, and suitable for bearing at least one first electrically conductive bar, said first bar being oriented along the contact axis and being arranged for electrically connecting the first lower contact strip and the first upper contact strip when said slider is in a first position.

Advantageously, the first lower contact strip and the first upper contact strip include an elastic boss suitable for exerting a pressing force on the first bar when said first bar is in the first position.

Advantageously, the slider is arranged to slide through the central passage from the first position to a second position to take the first bar out of contact with the first lower contact strip and with the first upper contact strip.

Preferably, the slider includes a stop that is arranged to stop the movement of the slider in the first position when the slider is moved through the central passage from the second position to the first position.

Advantageously, the slider includes rounded outer angles and the central passage includes rounded inner angles to centre the slider along the centre axis in the central passage.

In one preferred embodiment, the slider includes at least one through-cavity, which is oriented along the contact axis, into which the first bar is inserted, and at least one lateral through-opening, which is oriented perpendicularly to the contact axis, the lateral through-opening leading into the through-cavity, and the first bar includes an excrescence extending into the lateral through-opening for immobilizing the first bar in the slider.

Preferably:
  the lower wall bears a second lower contact strip and a second upper contact strip, said second upper contact strip being located facing the second lower contact strip along a direction that is parallel to the contact axis; and
  the slider is suitable for bearing a second bar, the first bar and the second bar being arranged such that:
    the first bar provides electrical contact between the first lower contact strip and the first upper contact strip and the second bar provides electrical contact between the second lower contact strip and the second upper contact strip when the slider is in the first position; and that
    the first bar is out of contact with the first lower contact strip and the first upper contact strip and the second bar is out of contact with the second lower contact strip and the second upper contact strip when the slider is in the second position.

Advantageously, a first distance between the first lower contact strip and the second lower contact strip is greater than or equal to a second distance between the first lower contact strip and the first upper contact strip.

Advantageously, a third distance between the first bar and the first lower contact strip or the first upper contact strip is greater than half of the second distance when the first bar is in the second position.

Preferably, the electrical power supply disconnector according to the invention further comprises an operating rod and the slider includes first hooks that are positioned at one of its ends to form a first device for latching onto the operating rod.

Advantageously, the operating rod includes second hooks at one of its ends to form a second latching device cooperating with the first hooks of the first latching device, the second hooks being arranged to latch onto the first hooks during a translation along the centre axis for the purpose of mechanically rigidly connecting the operating rod and the slider.

Advantageously, the first hooks and/or the second hooks are arranged to deform during a latching operation between the slider and the operating rod and to return to their original shape so as to remain latched onto one another for the purpose of mechanically rigidly connected the operating rod and the slider.

Preferably, the operating rod includes a spring that is oriented along the centre axis, exerting a thrust on the operating rod so as to drive the slider that is mechanically rigidly connected to the operating rod from the first position to the second position.

Preferably, the operating rod includes a rotary lock that is arranged to keep the slider mechanically rigidly connected to the operating rod in the first position when the rotary lock is in a locked position.

Advantageously, the spring exerts the thrust on the operating rod so as to drive the slider, which is mechanically rigidly connected to the operating rod, from the first position to the second position when the rotary lock is in an unlocked position.

Another subject of the invention is a module for protection from electrical faults that is intended to cooperate with a device for breaking an electric current, said protection module including:
- at least one sensor that is positioned around at least one current conductor so as to deliver a signal that is representative of the electric current;
- a processing unit, connected to the sensor, for processing the signal arising from the sensor and producing a measurement;
- a circuit for supplying power to the processing unit; and current conductors;
- an electrical power supply disconnector such as described above, connected in series between the at least one current conductor and the circuit for supplying power to the processing unit so as to establish or to sever the connection between the, at least one, current conductor and the power supply circuit.

BRIEF DESCRIPTION OF THE DRAWINGS

Other advantages and features will become more clearly apparent from the following description of particular embodiments of the invention, which are given by way of non-limiting examples and shown in the appended drawings in which.

DETAILED DESCRIPTION OF PREFERRED EMBODIMENTS

Figure 1A:
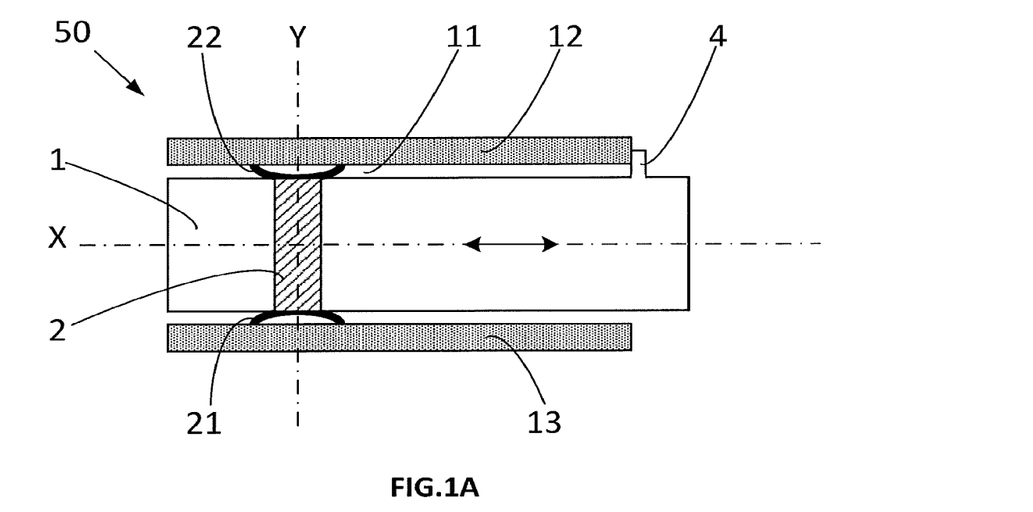
FIG. 1A is a schematic representation of an electrical power supply disconnector shown in a first position.

An electrical power supply disconnector is most particularly used in a module for protection from electrical faults for establishing or severing the connection between current conductors and a power supply circuit. This functionality is important since it allows the power supply circuit to be disconnected during dielectric tests. FIG. 1A is a schematic representation of the electrical power supply disconnector 50 shown in a first position. Said disconnector is mainly composed of two portions: a housing 10 and a slider 1. The housing 10, which is preferably rectangular in section and substantially parallelepipedal in shape, includes a central passage 11 that is oriented along a centre axis X. The housing 10 is formed of walls, the inner surfaces of which, facing the centre axis X, define the central passage 11. A lower wall 13 has an inner surface facing an inner surface of an upper wall 12. Two lateral walls, not shown in FIG. 1A, face one another. The two other faces are preferably open. The lower wall 13 bears, on its inner surface, at least one first lower contact strip 21, made of an electrically conductive material, and the upper wall 12 bears, on its inner surface, at least one first upper contact strip 22, made of an electrically conductive material, said first upper contact strip 22 being located facing the first lower contact strip 21 along a contact axis Y.

The slider 1 is arranged to slide through the central passage 11 in the direction of the centre axis X, and suitable for bearing at least one first bar 2 made of an electrically conductive material, said first bar 2 being oriented along the contact axis Y for the purpose of electrically connecting the first lower contact strip 21 and the first upper contact strip 22 when the slider 1 is in a first position, as shown in FIG. 1A. The first lower contact strip 21, the bar 2 and the first upper contact strip 22 are aligned along the axis Y. The direction of the axis X in the direction of the axis Y are preferably substantially perpendicular. While the bar 2 is preferably flush with the surface of the slider, it may protrude slightly so as to ensure good electrical contact with any type of lower 21 or upper 22 contact strip. To ensure solid contact and to provide a tactile sensation during an operation, at least one from the first lower contact strip 21 and the first upper contact strip 22 includes an elastic boss that is suitable for exerting a pressing force on the first bar 2 when said first bar 2 is in the first position. Preferably, the elastic boss is formed by making each contact strip 21, 22 in the shape of a flexible tongue.

In the first position, with one of the current conductors being connected to one of the contact strips 21 or 22, respectively, and the other of the contact strips 22 or 21, respectively, being connected to a power supply circuit, the power supply circuit is supplied with electrical power by the current conductor.

Figure 1B:
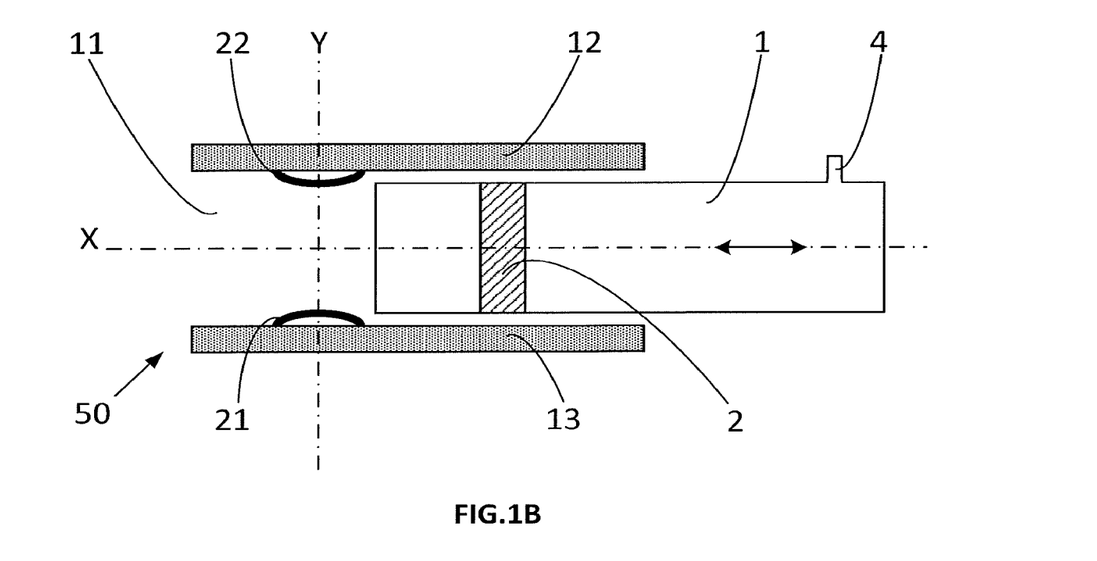
FIG. 1B is a schematic representation of the electrical power supply disconnector shown in a second position.

The slider 1 is arranged to slide through the central passage 11 from the first position to a second position to take the first bar 2 out of contact with the first lower contact strip 21 and with the first upper contact strip 22. Thus, the power supply circuit is not supplied with electrical power. FIG. 1B is a schematic representation of the electrical power supply disconnector 50 shown in the second position.

The slider may be moved successively from the first position to the second position and vice versa. The central passage 11 preferably includes no surface through which the centre axis X passes so as not to impose any particular direction of assembly. However, the slider 1 includes a stop 4 that is arranged to stop the movement of the slider 1 in the first position when the slider 1 is moved through the central passage 11 from the second position to the first position. The precise positioning of the bar 2 in the contact axis Y is thus ensured when the slider 1 is in the first position.

Figure 2A:
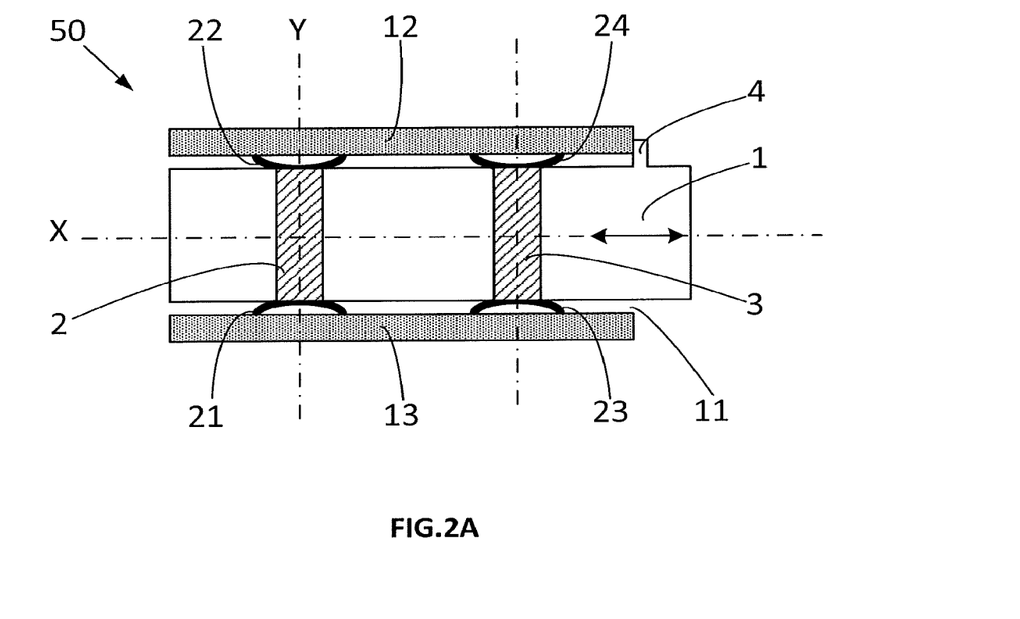
FIG. 2A is a schematic representation of the electrical power supply disconnector according to one preferred embodiment shown in the first position.
Figure 2B:
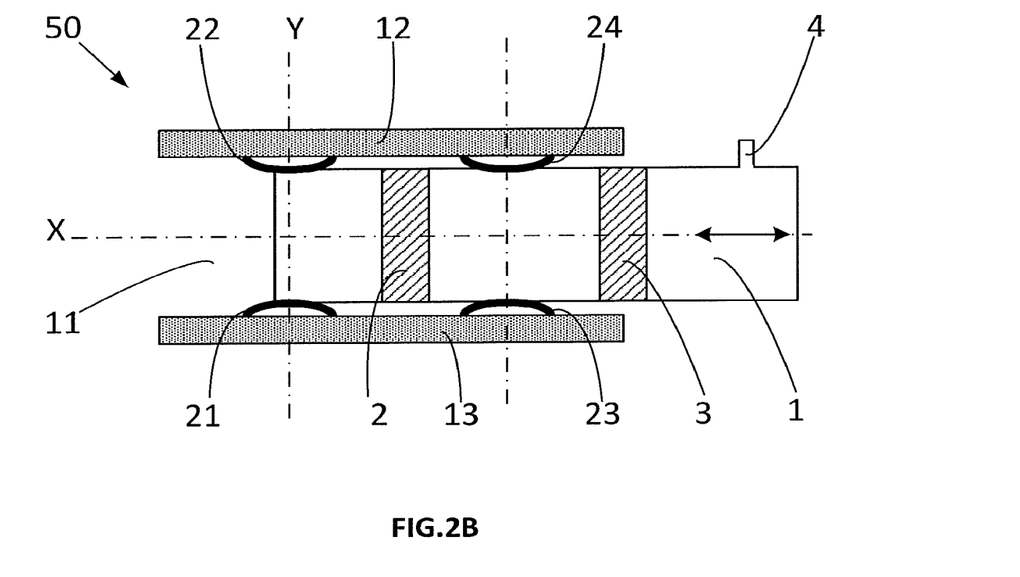
FIG. 2B is a schematic representation of the electrical power supply disconnector according to one preferred embodiment shown in the second position.

Since the invention is particularly intended to establish or to sever the connection between current conductors of a three-phase network and a power supply circuit, it is therefore necessary to be able to sever the connection with at least two current conductors. FIG. 2A is a schematic representation of the electrical power supply disconnector 50, shown in the first position, according to one preferred embodiment arrangement, for establishing the connection with two current conductors, and FIG. 2B is a schematic representation of the electric power supply disconnector, according to one preferred embodiment, shown in the second position. The lower wall 13 bears a second lower contact strip 23 and the upper wall 12 bears a second upper contact strip 24, said second upper contact strip 24 being located facing the second lower contact strip 23 along a direction that is parallel to the contact axis Y. The slider 1 is suitable for bearing a second bar 3. The first bar 2 and the second bar 3 are arranged such that:

the first bar 2 provides electrical contact between the first lower contact strip 21 and the first upper contact strip 22 and the second bar 3 provides electrical contact between the second lower contact strip 23 and the second upper contact strip 24 when the slider 1 is in the first position, as illustrated in FIG. 2A, and that the first bar 2 is out of contact with the first lower contact strip 21 and the first upper contact strip 22 and the second bar 3 is out of contact with the second lower contact strip 23 and the second upper contact strip 24 when the slider 1 is in the second position, as illustrated in FIG. 2B. The first bar 2 does not come into contact with contact strips 23 and 24 when the slider is in the second position.

Thus, the connection with the two current conductors is established or severed simultaneously during a single movement of the slider 1. The risk of connecting one current conductor before the other is thus eliminated, thereby eliminating the risk of overvoltage on the power supply circuit when moving the slider 1.

Figure 3:
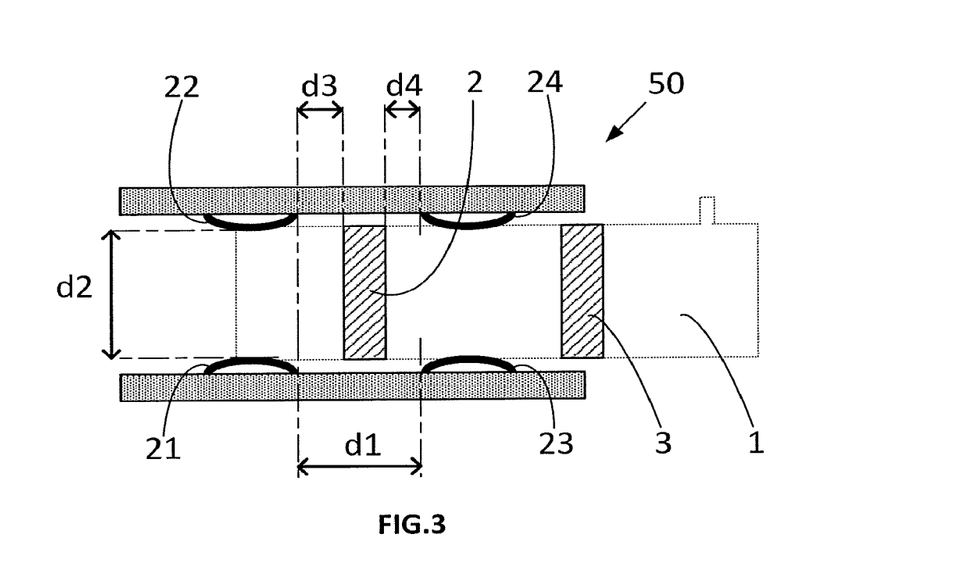
FIG. 3 is a schematic representation of the electrical power supply disconnector shown in the second position bearing the dimensional references and lines forming part of the technical features of the invention.

The electrical power supply disconnector 50 is designed to withstand dielectric strength tests: there should be no arc initiation between the various contacts during the tests. FIG. 3 is a schematic representation of the electrical power supply disconnector shown in the second position bearing dimensional references and lines forming part of the technical features of the invention. To avoid the initiation of an arc between the current conductors that are connected to the contact strips 21 and 23 or between the current conductors that are connected to the contact strip 22 and 24, a first distance d1 between the first lower contact strip 21 and the second lower contact strip 23 is greater than or equal to a second distance d2 between the first lower contact strip 21 and the first upper contact strip 22. Since the upper contact strip 24 is located facing the second lower contact strip 23 along a direction that is parallel to the contact axis Y, the first distance d1 is between the first upper contact strip 22 and the second upper contact strip 24. To avoid the bar 2 becoming an initiation point between the first lower contact strip 21 and the first upper contact strip 22, a third distance d3 between the first bar 2 and the first lower contact strip 21 or the first upper contact strip 22 is greater than half of the second distance d2 between the first lower contact strip 21 and the first upper contact strip 22 when the first bar 2 is in the second position. Similarly, to avoid the bar 2 becoming an initiation point between the second lower contact strip 23 and the second upper contact strip 24, a fourth distance d4 between the first bar 2 and the second upper contact strip 24 or the second upper contact strip 24 is greater than half of the second distance d2 when the first bar 2 is in the second position. Preferably, d1 is greater than or equal to 3.2 mm, d2 is greater than or equal to 3.2 mm, and d3 and d4 are greater than or equal to 1.6 mm. As a variant, to increase the second distance d2 without increasing distance between the lower wall 13 and the upper wall 12, the upper contact strips 22, 24 and the lower contact strips 21, 23 may be offset so as to tilt the direction of the contact axis Y with respect to the direction of the centre axis X. In this case, the distance d1 having to be used as a reference will be the shortest of the distances between either the first upper contact strip 22 and the second lower contact strip 23 or between the first lower contact strip 21 and the second upper contact strip 24.

Figure 4:
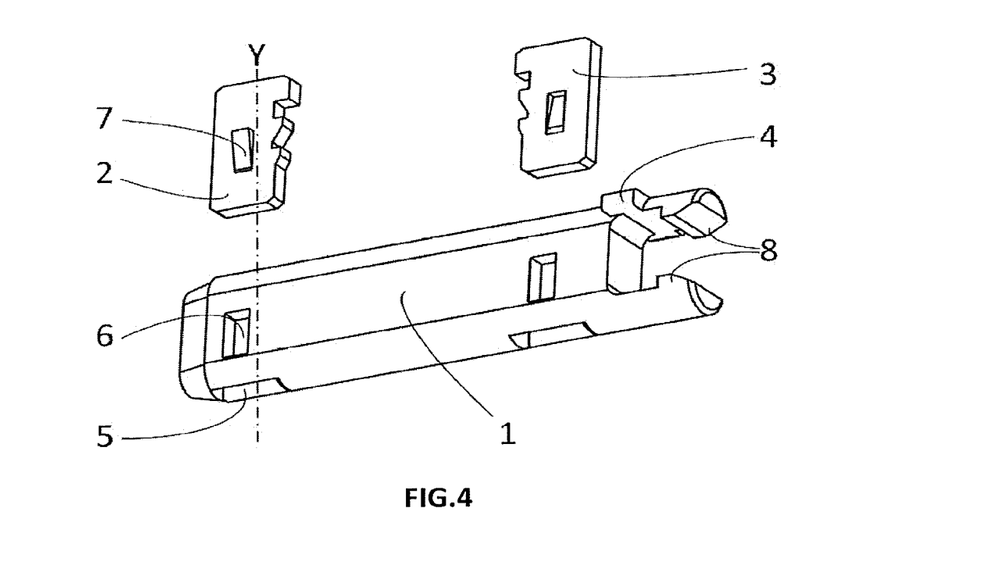
FIG. 4 is an exploded view of a slider forming part of the electrical power supply disconnector.

The electrical power supply disconnector 50 is not designed to perform a large number of movements over the service life of the protection module. It is however necessary for the movement of the slider 1 through the central passage 11, for transitioning from the first position to the second position, not to present any needless resistance. For this purpose, the slider 1 includes rounded outer angles and that the central passage 11 includes rounded inner angles at the join between two surfaces. In this way, the slider 1 is centred along the centre axis X in the central passage 11 and friction between the slider 1 and the interior of the housing 10 is minimized. FIG. 4 illustrates in particular the rounded outer angles of the slider 1. FIG. 4 is an exploded view illustrating the construction of the slider 1. The slider 1 bears at least one first bar 2: the first bar is inserted into the slider, held in place so as to be rigidly connected to the slider and follow the same movements as the slider 1, without changing orientation or position. To achieve this, the slider 1 includes at least one through-cavity 5, oriented along the contact axis Y. The first bar 2 is inserted into the through-cavity 5. A lateral through-opening 6, oriented perpendicularly to the contact axis Y, leads into the through-cavity 5. The bar 2 includes an excrescence 7 extending into the lateral through-opening 6 for immobilizing the first bar 2 in the slider 1. Thus, when the bar 2 is inserted into the through-cavity 5, the excrescence 7 exerts a substantial friction force until the excrescence 7 is positioned inside the lateral opening 6. Once the excrescence 7 is positioned inside the lateral opening 6, the bar 2 is correctly immobilized within the slider, i.e. the bar 2 is flush with the surface of the slider or protrudes slightly so as to provide good electrical contact with the lower 21 and upper 22 contact strips when the slider 1 is in the first position. The slider 1 may bear a plurality of bars, at least one first bar 2 and for example a second bar 3 such as illustrated by FIG. 4. Other embodiments of the slider 1 provided with at least one conductive bar 2 may be envisaged: overmoulding the slider 1 around at least one first bar 2, or by using 3D printing, or else using a ring made of a conductive metal instead of the bar.

Figure 5:
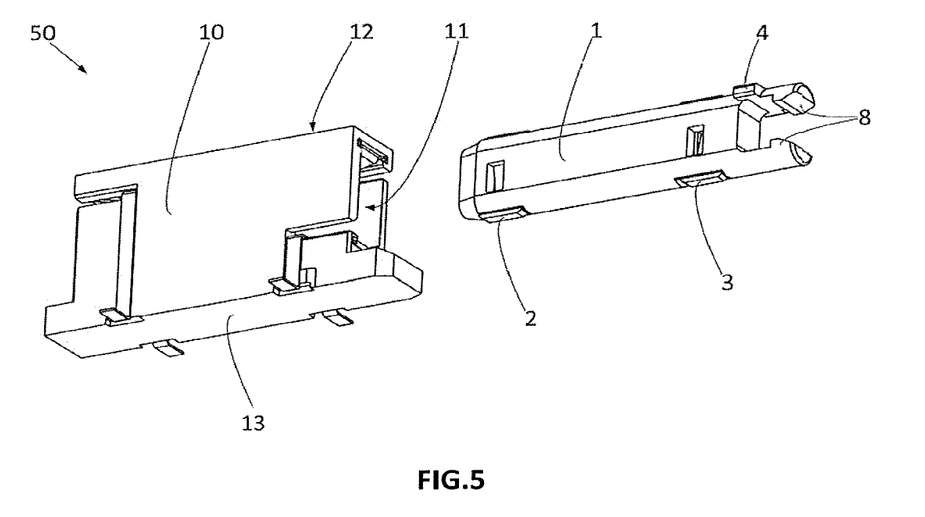
FIG. 5 is a perspective view of the electrical power supply disconnector according to one preferred embodiment of the invention showing a housing and the slider.
Figure 6:
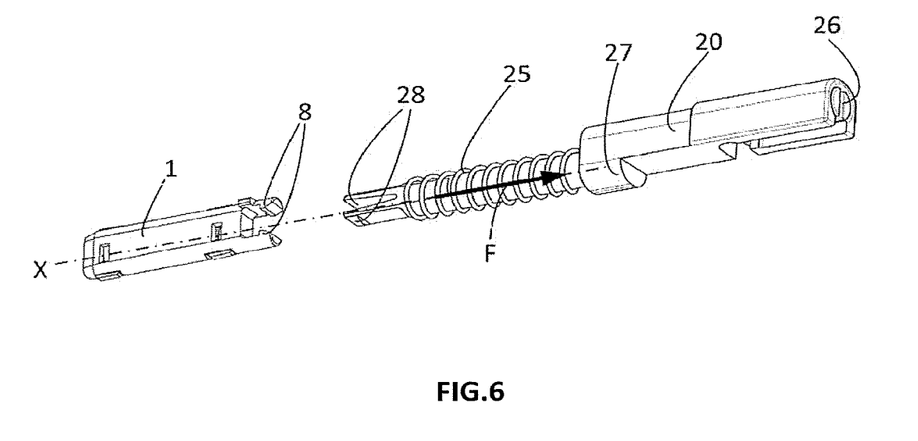
FIG. 6 is a perspective view showing how the slider mechanically latches onto an operating rod.

FIG. 5 is a perspective view of the electrical power supply disconnector 50 according to one preferred embodiment of the invention including a housing 10 and the slider 1. The electrical power supply disconnector 50 of the invention is intended to be incorporated within a module for protection from electrical faults in which space is limited and in which it must be located as close as possible to the current conductors. Additionally, the disconnector must be capable of being operated by an operator in an entirely safe and straightforward manner, accessible from the front surface of the protection module. For this purpose, the electrical power supply disconnector 50 of the invention further comprises an operating rod 20. According to the invention, the slider 1 includes first hooks 8 that are positioned at one of its ends to form a first device for latching onto the operating rod 20. FIG. 6 is a perspective view showing how the slider mechanically latches onto an operating rod. The operating rod 20 includes second hooks 28 at one of its ends to form a second latching device cooperating with the first hooks 8 of the first latching device of the slider 1. The second hooks 28 are arranged to latch onto the first hooks 8 during a translation along the centre axis X for the purpose of mechanically rigidly connecting the operating rod 20 and the slider 1. With reference to FIG. 6, during the latching operation between the slider 1 and the operating rod 20, the second hooks 28 deform slightly by moving closer to one another as they come into contact with the hooks 8 of the slider 1. The end of the hooks 8 and 28 is chamfered so as to orient the movement of the hooks in the desired direction. Once the slider 1 and the operating rod 20 have completed their movement, the first hooks 8 and the second hooks 28 return to their original shape so as to remain latched onto one another for the purpose of mechanically rigidly connecting the operating rod 20 and the slider 1. Thus, the slider 1 may be operated by means of the operating rod 20. Any other type of attachment may be envisaged, for example by making the first hooks 8 in the shape of rings or spheres and making the second hooks 28 in a shape that is suitable for cooperating with the first hooks 8.

Figure 7A:
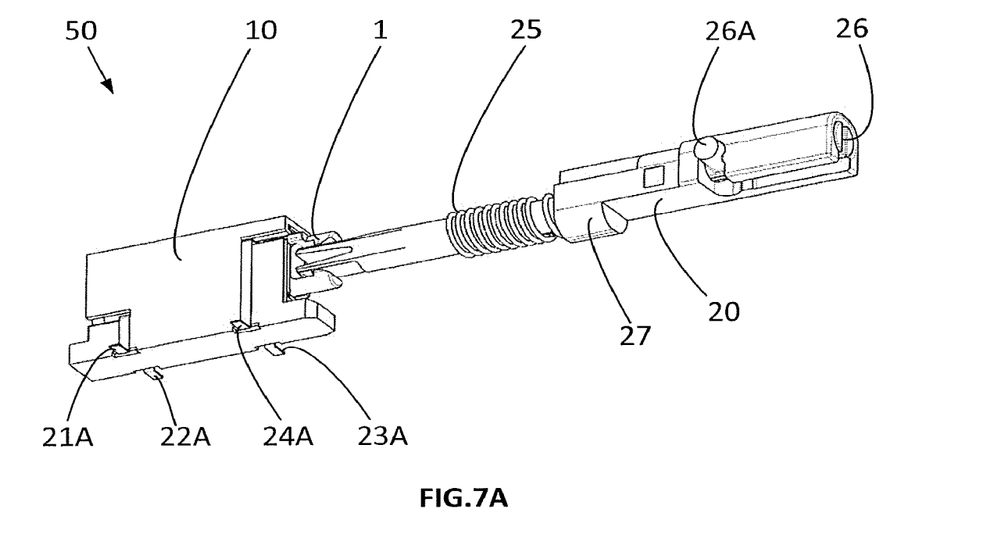
FIG. 7A is a perspective view showing the power supply disconnector and the operating rod in the first position.
Figure 7B:
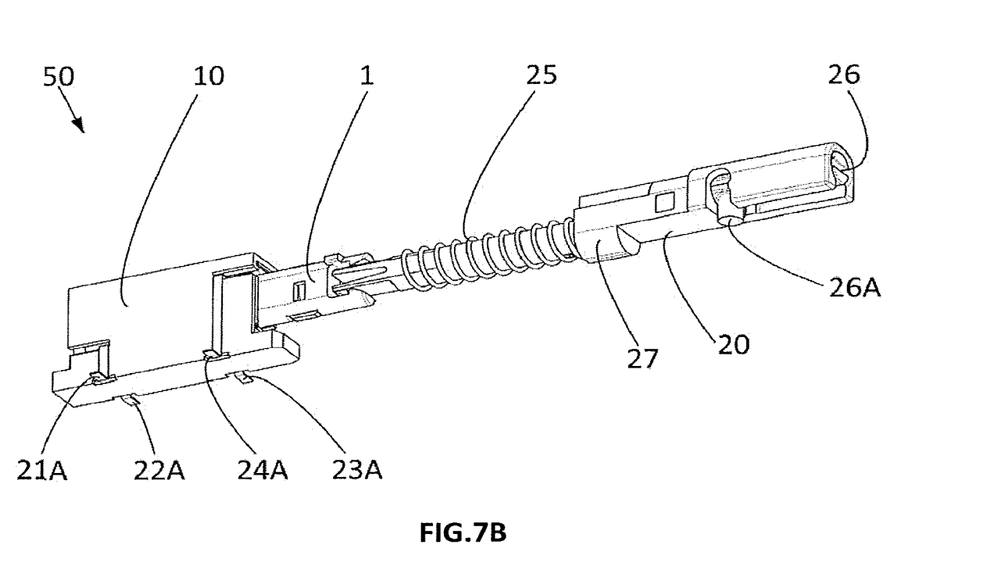
FIG. 7B is a perspective view showing the power supply disconnector latched onto the operating rod in the second position.

The operating rod 20 also includes a spring 25 that is oriented along the centre axis X, exerting a thrust F on the operating rod 20 so as to drive the slider 1 that is mechanically rigidly connected to the operating rod 20 from the first position to the second position. A lock 26 is arranged in the operating rod 20 so as to hold the slider 1 in the first position. The lock 26 includes a cylindrical central portion that is oriented along the direction of the centre axis X and that is rotatably movable about the centre axis X. A stud 26A protrudes from one end of the lock 26 so as to be housed in a notch in a housing of the protection module 30 so as to lock the position of the slider 1 in the first position as shown in FIG. 7A. Rotating the lock 26 towards an unlocked position releases the locking effected by the stud 26A. The spring 25 exerts the thrust F on the operating rod 20 so as to push the operating rod 20 and mechanically rigidly connected slider 1 to the second position as shown in FIG. 7B. The operating rod has a shoulder 27 for limiting movement in the X direction and preventing the operating rod 20 from exiting the protection module. The shoulder 27 stops against the front surface of the protection module (not shown in the figures).

Figure 8:
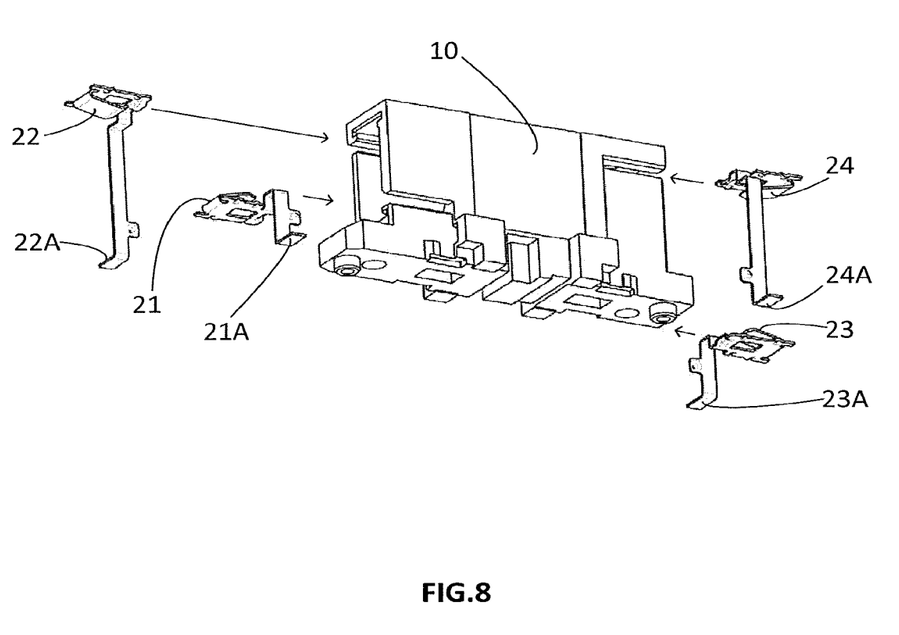
FIG. 8 is an exploded view of the housing of the electrical power supply disconnector.

The power supply disconnector is preferably intended to be soldered to a printed circuit board using surface-mount technology (SMT). Advantageously, the printed circuit board may be positioned in a plane that is parallel to the centre axis X. FIG. 8 is an exploded view of the housing 10 to illustrate the attachment of the contact strips to the outside of said housing 10. The first lower contact strip 21 is linked to a solder lug 21A, the first upper contact strip 22 is linked to a solder lug 22A, the second lower contact strip 23 is linked to a solder lug 23A and the second upper contact strip 24 is linked to a solder lug 24A. Preferably, to decrease the cost of each part and to limit the variety of parts, the solder lugs 21A and 23A are identical to one another; the same applies for the solder lugs 22A and 24A.

Figure 9:
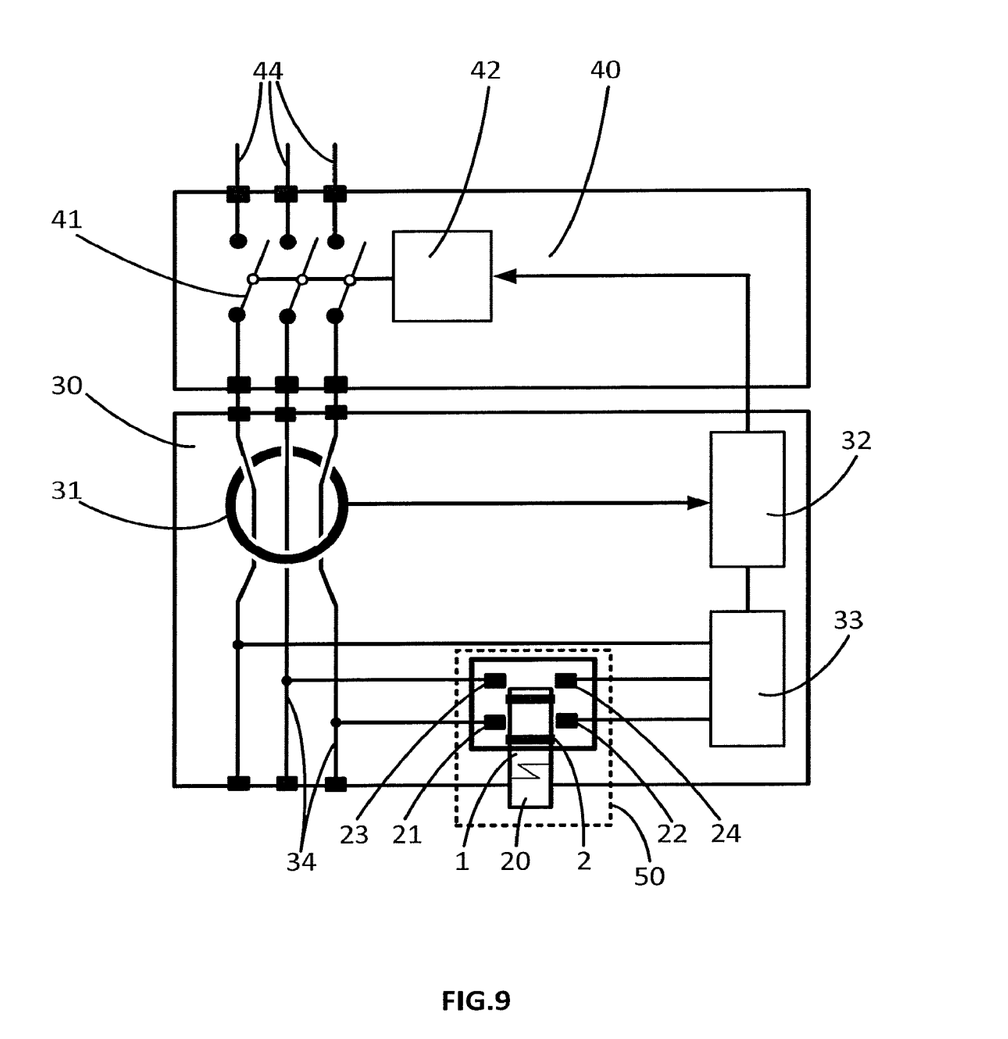
FIG. 9 is a schematic representation of a protection module including a power supply disconnector for its own electrical power supply in association with a breaking device intended to remove an electrical fault on current lines.

The module for protection from electrical faults 30 is arranged to cooperate with a device for breaking an electric current 40 so as to protect the electrical installation in the case of a fault of electrical origin. FIG. 9 is a schematic representation of a protection module 30, in association with a breaking device 40. The association of the protection module 30 and the device for breaking an electric current 40 forms a unit that is generally referred to as a "circuit breaker" or "switching device". The device for breaking an electric current 40 is connected to at least two electrical lines 44, and includes an actuator 42 for controlling the opening of power contacts 41. The electrical power supply disconnector 50 according to the invention is intended to be used preferably in the module for protection from electrical faults 30, also referred to as the "tripping device", for establishing or severing the connection between current conductors 34 and a power supply circuit 33. The connection is established when the slider 1 is in the first position, and the connection is severed when the slider is in the second position. The current lines 44 are linked by connections to the current conductors 34 when the protection module 30 cooperates with the device 40 for breaking an electric current. The module for protection from electrical faults 30 includes a processing unit 32, a circuit 33 for supplying power to the processing unit 32 and an electrical power supply disconnector 50 according to the invention. The electrical power supply disconnector 50 is connected in series between at least one current conductor 34 and the power supply circuit 33. Advantageously, the power supply disconnector is connected to two phases of a three-phase network. The electrical power supply disconnector 50 establishes or severs the connection between the current conductors 34 and the power supply circuit 33 so as to avoid the power supply circuit 33 being damaged, for example during dielectric tests. The power supply circuit 33 supplies power to the processing circuit 32 that is linked to at least one current sensor 31. The current sensor 31 is positioned around at least one current conductor 34 so as to deliver a signal that is representative of the electric current flowing through the current lines 44 to the processing unit 32. When an electrical fault is present on at least one current line 44, the processing unit 32 sends an order to open the electrical circuit to an actuator 42 so as to control the opening of the power contacts 41. In this way the electrical fault is removed. The power supply disconnector of the invention may easily be adapted to sever the connection between three current conductors 34 and a power supply circuit by adding one upper contact strip and one lower contact strip to the housing 10 and an additional bar to the slider 1.

The electrical power supply disconnector 50 of the invention is particularly suitable for connecting a power supply circuit to current conductors in a module for protection from electrical faults: the movement of the slider 1 bearing one or more contact bars 2, 3 along a centre axis X allows the disconnector to be highly compact. Such an innovative design makes it possible to leave sufficient distances d1, d2 and d3 between the various contact strips 21, 22, 23, 24 to ensure that the contacts are sufficiently isolated, when the disconnector is in the second position, during dielectric tests. Lastly, the simplicity of the design makes the industrial manufacture of the power supply disconnector economical.

The invention claimed is:

1. An electrical power supply disconnector used in a module for protection from electrical faults for establishing or severing the connection between current conductors and a power supply circuit, said power supply disconnector comprising:
    a housing of rectangular section, including an upper wall and a lower wall, the inner surfaces of the upper wall and of the lower wall facing each other and defining a central passage oriented along a centre axis, the lower wall bearing, on its inner surface, at least one first lower contact strip, the upper wall bearing, on its inner surface, at least one first upper contact strip, said first upper contact strip being located facing the first lower contact strip along a contact axis; and
    a slider arranged to slide through the central passage in the direction of the centre axis, and suitable for bearing at least one first electrically conductive bar, said first bar being oriented along the contact axis and being arranged for electrically connecting the first lower contact strip and the first upper contact strip when said slider is in a first position,
    wherein the first lower contact strip and the first upper contact strip include an elastic boss suitable for exerting a pressing force on the first bar when said first bar is in the first position.

2. The electrical power supply disconnector according to claim 1, wherein the slider is arranged to slide through the central passage from the first position to a second position to take the first bar out of contact with the first lower contact strip and with the first upper contact strip.

3. The electrical power supply disconnector according to claim 2, wherein the slider includes a stop that is arranged to stop the movement of the slider in the first position when the slider is moved through the central passage from the second position to the first position.

4. The electrical power supply disconnector according to claim 1, wherein the slider includes rounded outer angles and that the central passage includes rounded inner angles to centre the slider along the centre axis in the central passage.

5. The electrical power supply disconnector according to claim 1, wherein:
    the slider includes at least one through-cavity, which is oriented along the contact axis, into which the first bar is inserted, and at least one lateral through-opening, which is oriented perpendicularly to the contact axis, the lateral through-opening leading into the through-cavity; and wherein
    the first bar includes an excrescence extending into the lateral through-opening for immobilizing the first bar in the slider.

6. The electrical power supply disconnector according to claim 1, wherein:
    the lower wall bears a second lower contact strip and a second upper contact strip, said second upper contact strip being located facing the second lower contact strip along a direction that is parallel to the contact axis;
    the slider is suitable for bearing a second bar, the first bar and the second bar being arranged such that:
    the first bar provides electrical contact between the first lower contact strip and the first upper contact strip and the second bar provides electrical contact between the second lower contact strip and the second upper contact strip when the slider is in the first position; and wherein
    the first bar is out of contact with the first lower contact strip and the first upper contact strip and the second bar is out of contact with the second lower contact strip and the second upper contact strip when the slider is in the second position.

7. The electrical power supply disconnector according to claim 6, wherein a first distance between the first lower contact strip and the second lower contact strip is greater than or equal to a second distance between the first lower contact strip and the first upper contact strip.

8. The electrical power supply disconnector according to claim 6, wherein a third distance between the first bar and the first lower contact strip or the first upper contact strip is greater than half of the second distance when the first bar is in the second position.

9. The electrical power supply disconnector according to claim 1, wherein it further comprises an operating rod and the slider comprises first hooks that are positioned at one of its ends to form a first device for latching onto the operating rod.

10. The electrical power supply disconnector according to claim 9, wherein the operating rod includes second hooks at one of its ends to form a second latching device cooperating with the first hooks of the first latching device, the second hooks being arranged to latch onto the first hooks during a translation along the centre axis for the purpose of mechanically rigidly connecting the operating rod and the slider.

11. The electrical power supply disconnector according to claim 10, wherein the first hooks and/or the second hooks are arranged to deform during a latching operation between the slider and the operating rod and to return to their original shape so as to remain latched onto one another for the purpose of mechanically rigidly connected the operating rod and the slider.

12. The electrical power supply disconnector according to claim 9, wherein the operating rod includes a rotary lock that is arranged to keep the slider mechanically rigidly connected to the operating rod in the first position when the rotary lock is in a locked position.

13. The electrical power supply disconnector according to claim 12, wherein the operating rod includes a spring that is oriented along the centre axis, exerting a thrust on the operating rod so as to drive the slider that is mechanically rigidly connected to the operating rod from the first position to the second position.

14. The electrical power supply disconnector according to claim 13, wherein the spring exerts the thrust on the operating rod so as to drive the slider, which is mechanically rigidly connected to the operating rod, from the first position to the second position when the rotary lock is in an unlocked position.

15. A module for protection from electrical faults that is intended to cooperate with a device for breaking an electric current, said protection module comprising:

at least one sensor that is positioned around at least one current conductor so as to deliver a signal that is representative of the electric current;

a processing unit, connected to the sensor, for processing the signal arising from the sensor and producing a measurement;

a circuit for supplying power to the processing unit; and current conductors;

wherein said module for protection from electrical faults comprises an electrical power supply disconnector according to claim 1, said electrical power supply disconnector being connected in series between the at least one current conductor and the circuit for supplying power to the processing unit so as to establish or to sever the connection between the, at least one, current conductor and the power supply circuit.

* * * * *